(12) United States Patent
Yin et al.

(10) Patent No.: US 10,118,834 B2
(45) Date of Patent: *Nov. 6, 2018

(54) SUPERPARAMAGNETIC COLLOIDAL PHOTONIC STRUCTURES

(75) Inventors: Yadong Yin, Riverside, CA (US); Jianping Ge, Riverside, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/597,794

(22) PCT Filed: Apr. 26, 2008

(86) PCT No.: PCT/US2008/005430
§ 371 (c)(1),
(2), (4) Date: May 6, 2010

(87) PCT Pub. No.: WO2009/017525
PCT Pub. Date: Feb. 5, 2009

(65) Prior Publication Data
US 2010/0224823 A1 Sep. 9, 2010

Related U.S. Application Data

(60) Provisional application No. 60/926,637, filed on Apr. 27, 2007.

(51) Int. Cl.
*C01G 49/08* (2006.01)
*G02F 1/29* (2006.01)
(Continued)

(52) U.S. Cl.
CPC .............. *C01G 49/08* (2013.01); *B82Y 30/00* (2013.01); *C09C 1/24* (2013.01); *G02F 1/09* (2013.01);
(Continued)

(58) Field of Classification Search
CPC ...... H01F 1/0054; H01F 1/0063; H01F 1/061; H01F 1/344; H01F 1/11; G02F 1/09;
(Continued)

(56) References Cited

U.S. PATENT DOCUMENTS 5,206,159 A * 4/1993 Cohen et al. ................. 435/180
5,776,360 A * 7/1998 Sieber ........................ 252/62.63
(Continued)

OTHER PUBLICATIONS

Date page for Lu et al. showing online publication date of Feb. 5, 2007.*

(Continued)

*Primary Examiner* — Matthew E. Hoban
*Assistant Examiner* — Lynne Edmondson
(74) *Attorney, Agent, or Firm* — Buchanan Ingersoll & Rooney PC (57) ABSTRACT

Monodisperse colloidal nanocrystal clusters of magnetite ($Fe_3O_4$) with tunable sizes from about thirty to about three hundred nanometers have been synthesized using a high-temperature hydrolysis process. The colloidal nanocrystal clusters are capped with polyelectrolytes, and highly water soluble. Each cluster is composed of many single magnetite crystallites, thus retaining the superparamagnetic behavior at room temperature. The combination of superparamagnetic property, high magnetization, and high water dispersibility makes the colloidal nanocrystal clusters ideal candidates for various important biomedical applications such as drug delivery and bioseparation. The present invention is further directed to methods for forming colloidal photonic crystals from both aqueous and nonaqueous solutions of the superparamagnetic colloidal nanocrystal clusters with an external magnetic field applied thereto. The diffraction of the photonic crystals can be tuned from near infrared to visible and further ultraviolet spectral region by varying the external magnetic field.

19 Claims, 10 Drawing Sheets

(51) Int. Cl.
    *H01F 1/34* (2006.01)
    *H01F 1/00* (2006.01)
    *G02B 1/00* (2006.01)
    *C09C 1/24* (2006.01)
    *B82Y 30/00* (2011.01)
    *G02F 1/09* (2006.01)

(52) U.S. Cl.
    CPC ...... *C01P 2002/72* (2013.01); *C01P 2002/80* (2013.01); *C01P 2004/04* (2013.01); *C01P 2004/32* (2013.01); *C01P 2004/62* (2013.01); *C01P 2004/64* (2013.01); *C01P 2004/84* (2013.01); *C01P 2006/42* (2013.01); *C01P 2006/60* (2013.01); *G02F 2202/32* (2013.01)

(58) Field of Classification Search
    CPC ....... G02F 1/29; G02F 2202/32; G02B 1/005; G02B 2207/101; C01G 49/08; C09C 1/24; C01P 2004/64; C01P 2004/62; C01P 2004/84; C01P 2004/32; C01P 2004/52; C01P 2004/80; C01P 2002/80; C01P 2006/42; B82Y 25/00; B82Y 30/00; B82Y 20/00
    USPC ................ 252/65.54, 62.56, 62.52, 62.51 R; 424/9.323; 977/773, 902, 811, 779, 960
    See application file for complete search history.

(56) References Cited

U.S. PATENT DOCUMENTS

| | | | |
|---|---|---|---|
| 6,123,920 A * | 9/2000 | Gunther et al. | 424/9.322 |
| 6,355,166 B1 | 3/2002 | Amarasinghe et al. | |
| 2002/0000398 A1* | 1/2002 | Skold | 209/214 |
| 2003/0129676 A1* | 7/2003 | Terstappen et al. | 435/7.21 |
| 2006/0019096 A1* | 1/2006 | Hatton et al. | 428/364 |
| 2006/0068203 A1* | 3/2006 | Ying et al. | 428/403 |
| 2006/0211941 A1 | 9/2006 | Gleich | |
| 2006/0233712 A1* | 10/2006 | Penades et al. | 424/9.34 |

OTHER PUBLICATIONS

Teixeira et al., "The effect of dipolar forces on the structure and thermodynamics of classical fluids", J. Phys.: Condens. Matter, 12 (2000), pp. R411-R434.*
http://merriam-webster.com/dictionary/crystallite, printed Jun. 18, 2014.*
http://innovateus.net/print/science/what-ferrofluid, printed Jun. 19, 2014.*
Lu et al. "Magnetic Nanoparticles: Synthesis, Protection, Functionalization, and Application", Angew. Chem. Int. Ed., 46, published online Feb. 5, 2007, pp. 1222-1244.*
Harris, "Polymer Stabilized Magnetite Nanoparticles and Poly(propylene oxide) Modified Styrene-Dimethacrylate Networks", Virginia Polytechnic Institute and State University, Chemistry Department, Apr. 19, 2002, pp. i, 1-5, 25, 34-58, 64-68, 77-80, 87-89 and 110.*
Jing et al., "One-step reverse precipitation synthesis of water-dispersible superparamagnetic magnetite nanoparticles", Mar. 2012, J Nanopart Res 14:827, pp. 1-8.*
Xu et al., 'Synthesis and Utilization of Monodisperse Superparamagnetic Colloildal Particles for Magnetically Controllable Photonic Crystals', 2002, Chem. Mater. vol. 14, pp. 1249-1256.*
Si et al., "Magnetic Monodisperse Fe3O4 Nanoparticles", published on web Jan. 7, 2005, Crystal Growth & Design, vol. 5, No. 2, pp. 391-393.*
International Search Report (PCT/ISA/210) dated Dec. 20, 2008.
Written Opinion (PCT/ISA/237) dated Dec. 19, 2008.
Asher et al., Photonic Crystal Aqueous Metal Cation Sensing Materials, *Anal. Chem.*, 2003, vol. 75, pp. 1676-1683.
Babes et al., Synthesis of Iron Oxide Nanoparticles Used as MRI Contrast Agents: A Parametric Study, *J. Colloid Interface Sci.*, 1999, vol. 212, pp. 474-482.
Bailey et al., Core-Shell Semiconductor Nanocrystals for Biological Labeling, *The Chemistry of Nanomaterials: Synthesis, Properties and Applications*, 2004, vol. 2, pp. 405-417.
Ben-Moshe et al., Fast Responsive Crystalline Colloidal Array Photonic Crystal Glucose Sensors, *Anal. Chem.*, 2006, vol. 78, pp. 5149-5157.
Braun et al., Introducing Defects in 3D Photonic Crystals: State of the Art, *Adv. Mater.*, 2006, vol. 18, pp. 2665-2678.
Brigger et al., Nanopaticles in Cancer Therapy and Diagnosis, *Adv. Drug Delivery Rev.*, 2002, vol. 54, pp. 631-651.
Casula et al., The Concept of Delayed Nucleation in Nanocrystal Growth Demonstrated for the Case of Iron Oxide Nanodisks, *J. Am. Chem. Soc.*, 2006, vol. 128, pp. 1675-1682.
Cengelli et al., Interaction of Functionalized Superparamagnetic Iron Oxide Nanoparticles with Brain Cells, *J. Pharmacol. Exp. Ther.*, 2006, vol. 318, No. 1, pp. 108-116.
Chen et al., Size-Dependent Magnetic Properties of $MnFe_2O_4$ Fine Particles Synthesized by Coprecipitation, *Phys. Rev. B*, 1996, vol. 54, No. 13, pp. 9288-9296.
Cui et al., Synthesis of PNIPAM-co-MBAA Copolymer Nantotubes with Composite Control, *Langmuir*, 2006, vol. 22, pp. 8205-8208.
Deng et al., Monodisperse Magnetic Single-Crystal Ferrite Microspheres, *Angew. Chem. Int. Ed.*, 2005, vol. 44, pp. 2782-2785.
Dillenback et al., Temperature-Programmed Assembly of DNA: Au Nanoparticle Bioconjugates, *Nano Letters*, 2006, vol. 6, No. 1, pp. 16-23.
Fleischhaker et al., Photochemically and Thermally Tunable Planar Defects in Colloidal Photonic Crystals, *J. Am. Chem. Soc.*, 2005, vol. 127, pp. 9318-9319.
Ge et al., Superparamagnetic Magnetite Colloidal Nanocrystal Clusters, *Angew. Chem. Int. Ed.*, 2007, vol. 46, pp. 4342-4345.
Goponenko et al., Modeling of Stimulated Hydrogel Volume Changes in Photonic Crystal $Pb^{2+}$ Sensing Materials, *J. Am. Chem. Soc.*, 2005, vol. 127, pp. 10753-10759.
Gu et al., Biofunctional Magnetic Nanoparticles for Protein Separation and Pathogen Detection, *Chem. Commun.*, 2006, pp. 941-949.
Gu et al., Photochemically Tunable Colloidal Crystals, *J. Am. Chem. Soc.*, 2000, vol. 122, pp. 12387-12388.
Halpert et al., Synthesis of CdSe/CdTe Nanobarbells, *J. Am. Chem. Soc.*, 2006, vol. 128, pp. 12590-12591.
Hendriksen et al., Finite-Size Modifications of the Magnetic Properties of Clusters, *Phys. Rev. B*, 1993, vol. 48, No. 10, pp. 7259-7273.
Hermanson, Bioconjugate Techniques, 1996, pp. 170-173.
Hillebrand et al., Woodpiles for Photons, *Science*, 2004, vol. 305, pp. 187-188.
Hyeon et al., Synthesis of Highly Crystalline and Monodisperse Maghemite Nanocrystals with a Size-Selection Process, *J. Am. Chem. Soc.*, 2001, vol. 123, pp. 12798-12801.
Jeong et al., Photonic Crystals with Thermally Switchable Stop Bands Fabricated from $Se@Ag_2Se$ Spherical Colloids, *Angew. Chem. Int. Ed.*, 2005, vol. 44, pp. 3099-3103.
Jeong et al., Magnetic Properties of Superparamagnetic $\gamma$-$Fe_2O_3$ Nanoparticles Prepared by Coprecipitation Technique, *J. Magn. Magn. Mater.*, 2005, vol. 286, pp. 5-9.
John, Strong Localization of Photons in Certain Disordered Dielectric Superlattices, *Phys. Rev. Letters*, 1987, vol. 58, pp. 2486-2489.
Jun et al., Nanoscale Size Effect of Magnetic Nanocrystals and Their Utilization for Cancer Diagnosis via Magnetic Resonance Imaging, *J. Am. Chem. Soc.*, 2005, vol. 127, pp. 5732-5733.
Krasnikov et al., Oxidation Effects in Epitaxial $Fe_3O_4$ Layers on MgO and $MgAl_2O_4$ Substrates Studied by X-ray Absorption, Flourescence and Photoemission, *Mater. Sci. Eng. B*, 2004, vol. 109, pp. 207-212.
Kuai et al., Tunable Electrchromic Photonic Crystals, *Appl. Phys. Letters*, 2005, vol. 86, pp. 221110-221113.
La Mer et al., Theory, Production and Mechanism of Formation of Monodispersed Hydrosols, *J. Am. Chem. Soc.*, 1950, vol. 72, pp. 4847-4854.

(56) References Cited

OTHER PUBLICATIONS

Lawrence et al., Dynamic Tuning of Organic Lasers with Colloidal Crystals, *Adv. Mater.*, 2006, vol. 18, pp. 300-303.
Lee et al., Nanoparticle Assemblies with Molecular Springs : A Nanoscale Thermometer, *Angew. Chem. Int. Ed.*, 2005, vol. 44, pp. 7439-7442.
Lee et al., Infrared Spectral Investigation of Polyacrylate Adsorption on Alumina, *J. Mater. Sci.*, 1996, vol. 31, pp. 471-478.
Li et al., Infrared Study of the Interaction of Charged Silica Particles with TiO2 Particles Containing Absorbed Cationic and Anionic Polyelectrolytes, *Langmuir*, 2005, vol. 21, pp. 2585-2590.
Libert et al., Model of Controlled Synthesis of Uniform Colloid Particles: Cadmium Sulfide, *Langmuir*, 2003, vol. 19, pp. 10679-10683.
Lu et al., Modifying the Surface Properties of Superparamagnetic Iron Oxide Nanoparticles Through a Sol-Gel Approach, *Nano Letters*, 2002, vol. 2, pp. 183-186.
Lumsdon et al., Dielectrophoretic Assembly of Oriented and Switchable Two-Dimensional Photonic Crystals, *Appl. Phys. Letters*, 2003, vol. 82, No. 6, pp. 949-951.
Mach et al., Switchable Bragg Diffraction From Liquid Crystal in Colloid-templated Structures, *J. Europhys. Letters*, 2002, vol. 58, No. 5, pp. 679-685.
Murray et al., Synthesis and Characterization of Monodisperse Nanocrystals and Close-Packed Nanocrystal Assemblies, *Annu. Rev. Mater. Sci.*, 2000, vol. 30, pp. 545-610.
Narayanaswamy et al., Crystalline Nanoflowers with Different Chemical Compositions and Physical Properties Grown by Limited Ligand Protection, *Angew. Chem. Int. Ed.*, 2006, vol. 45, pp. 5361-5364.
Pellegrino et al., Hydrophobic Nanocrystals Coated with an Amphiphilic Polymer Shell: A General Route to Water Soluble Nanocrystals, *Nano Letters*, 2004, vol. 4, pp. 703-707.
Peng et al., Nearly Monodisperse and Shape-Controlled CdSe Nanocrystals via Alternative Routes : Nucleation and Growth, *J. Am. Chem. Soc.*, 2002, vol. 124, pp. 3343-3353.
Petri-Fink et al., Development of Functionalized Superparamagnetic Iron Oxide Nanoparticles for Interaction with Human Cancer Cells, *Biomaterials*, 2005, vol. 26, pp. 2685-2694.
Pileni et al., Nanocrystal Self-Assemblies: Fabrication and Collective Properties, *J. Phys. Chem. B*, 2001, vol. 105, pp. 3358-3371.
Pileni, The Role of Soft Colloidal Templates in Controlling the Size and Shape of Inorganic Nanocrystals, *Nature Mater.*, 2003, vol. 2, pp. 145-150.
Prasad et al., A Photonic Crystal Sensor Based on the Superprism Effect, *Opt. Mater.*, 2006, vol. 29, pp. 56-59.
Shevchenko et al., Structural Diversity in Binary Nanoparticle Superlattices, *Nature*, 2006, vol. 439, pp. 55-59.
Si et al., Magnetic Mondisperse $Fe_3O_4$ Nanoparticles, *Crys. Growth Des.*, 2005, vol. 5, pp. 391-393.
Sumioka et al., Tuning the Optical Properties of Inverse Opal Photonic Crystals by Deformation, *Adv. Mater.*, 2002, vol. 14, pp. 1284-1286.
Sun et al., Size-Controlled Synthesis of Magnetite Nanoparticles, *J. Am. Chem. Soc.*, 2002, vol. 124, pp. 8204-8205.
Sun et al., Monodisperse $MFe_2O_4$ (M=Fe, Co, Mn) Nanoparticles, *J. Am. Chem. Soc.*, 2004, vol. 126, pp. 273-279.
Sun et al., Shape-Controlled Synthesis of Gold and Silver Nanoparticles, *Science*, 2002, vol. 298, pp. 2176-2179.
Van Blaaderen, From the de Broglie to Visible Wavelenths: Manipulating Electrons and Photons with Colloids, *MRS Bulletin*, 1998, vol. 23, pp. 39-43.
Wang et al., One-Pot Synthesis and Bioapplication of Amine-Functionalized Magnetite Nanoparticles and Hollow Nanospheres, *Chem. Eur. J.*, 2006, vol. 12, pp. 6341-6347.
Wang et al., Synthesis and Magnetic Properties of Uniform Hematite Nanocubes, *J. Phys. Chem. C*, 2007, vol. 111, pp. 3551-3554.
Wang et al., Pulling Nanoparticles into Water: Phase Transfer of Oleic Acid Stabilized Monodisperse Nanoparticles into Aqueous Solutions of $\alpha$-Cyclodextrin, *Nano Letters*, 2003, vol. 3, pp. 1555-1559.
Wang et al., A General Strategy for Nanocrystal Synthesis, *Nature*, 2005, vol. 437, pp. 121-124.
Weissleder et al., Magnetically Labeled Cells Can be Detected by MR Imaging, *J. Magn. Reson. Imaging*, 1997, vol. 7, pp. 258-263.
Willis et al., Spectroscopic Characterization of the Surface of Iron Oxide Nanocrystals, *Chem. Mater.*, 2005, vol. 17, pp. 5970-5975.
Xia et al., Monodispersed Colloidal Spheres: Old Materials with New Application, *Adv. Mater.*, 2000, vol. 12, pp. 693-713.
Xie et al., One-Pot Synthesis of Monodisperse Iron Oxide Nanoparticles for Potential Biomedical Applications, *Pure Appl. Chem.*, 2006, vol. 78, pp. 1003-1014.
Xu et al., Superparamagnetic Photonic Crystals, *Adv. Mater.*, 2001, pp. 1681-1684.
Xu et al., Synthesis and Utilization of Monodisperse Superparamagnetic Colloidal Particles for Magnetically Controllable Photonic Crystals, *Chem. Mater.*, 2002, pp. 1249-1256.
Yablonovitch, Inhibited Spontaneous Emission in Solid-State Physics and Electronics, *Phys. Rev. Letters*, 1987, vol. 58, pp. 2059-2062.
Yin et al., Study on Interaction Between Tb(III) and Poly(N-Isopropylacrylamide), *Eur. Polym. J.*, 2006, vol. 42, pp. 1305-1312.
Yin et al., Colloidal Nanocrystals Synthesis and the Organic-Inorganic Interface, *Nature*, 2005, vol. 437, pp. 664-670.
Yu et al., Aqueous Dispersion of Monodisperse Magnetic Iron Oxide Nanocrystals Through Phase Transfer, *Nanotechnology.*, 2006, vol. 17, pp. 4483-4487.
Invitation to Pay Additional Fees and, Where Applicable, Protest Fee dated Oct. 28, 2010 issued in PCT/US2010/001105.

\* cited by examiner

SUPERPARAMAGNETIC COLLOIDAL PHOTONIC STRUCTURES

CROSS-REFERENCE TO RELATED APPLICATIONS

This application claims the benefit of U.S. Provisional Patent Application Ser. No. 60/926,637, filed Apr. 27, 2007, the contents of which are hereby incorporated herein by reference.

BACKGROUND OF THE INVENTION

This invention relates to methods of forming superparamagnetic magnetite colloidal nanocrystal clusters and construction of colloidal photonic crystals using these clusters as building blocks.

Recent advances in colloidal synthesis have enabled the preparation of high quality nanocrystals with controlled size and shape. Focus of synthetic' efforts appear to be shifting to creation of secondary structures of nanocrystals, either by self-assembly or through direct solution growth. Manipulation of the secondary structures of nanocrystals is desired in order to combine the ability to harness the size-dependent properties of individual nanocrystals with the possibility to tune collective properties due to the interactions between the subunits.

Superparamagnetic nanocrystals have proved to be very promising for biomedical applications as they are not subject to strong magnetic interactions in dispersion. Iron oxide nanocrystals have received the most attention for this purpose because of their biocompatibility and stability in physiological conditions. Several robust approaches have been developed for synthesizing magnetic iron oxide (e.g., $\gamma\text{-}Fe_2O_3$ or $Fe_3O_4$) nanocrystals with tightly controlled size distribution, typically through organometallic processes at elevated temperatures in non-polar solvents. Additional steps of surface modification or lipid encapsulation are usually performed to transfer the hydrophobic nanocrystals from non-polar solvent to water for biomedical applications. The nanocrystals prepared using these methods, with dimensions of order ten nanometers (nm), have a low magnetization per particle so that it is difficult to effectively separate them from solution or control their movement in blood using moderate magnetic fields, thus limiting their usage in some practical applications such as separation and targeted delivery. Increasing the particle size increases the saturation magnetization, but also induces the superparamagnetic-ferromagnetic transition (at a particle size ~30 nm for $Fe_3O_4$) so that nanocrystals are no longer dispersible in solution. The strategy of forming clusters of magnetite nanocrystals has the advantage of increasing the magnetization in a controllable manner while retaining the superparamagnetic characteristics.

Accordingly, what has been needed and heretofore unavailable are superpara-magnetic nanocrystals that overcome the deficiencies of existing configurations so as to eliminate the problem of increasing the particle size producing nanocrystals that are not dispersible in solution. The present invention disclosed herein satisfies these and other needs.

Besides magnetic separation, these magnetite colloidal nanocrystal clusters also find its application in construct novel solution form photonic crystals. Photonic crystals are spatially periodic dielectric structures displaying photonic bandgaps in which certain optical modes can not exist. They have attracted much attention because of their important optoelectronic applications where manipulation of photons is required, for example, as photonic components intended for telecommunications, lasers, and sensors. Among these applications, a highly desirable feature is to have a tunable bandgap, which can be conveniently controlled by external stimuli. Although considerable efforts have been devoted along this direction by changing the refractive indices of the materials, the lattice constants or spatial symmetry of the crystals, the tunability has been typically limited to tens of nanometers in diffraction wavelength. A known system was developed from fabricated colloidal photonic crystals using charged polystyrene microspheres containing superparamagnetic nanoparticles. Changes in diffraction wavelength above one hundred nanometers can be achieved by imposition of magnetic fields.

SUMMARY OF THE INVENTION

The present invention is directed to a chemical synthetic method for the production of monodisperse colloidal nanocrystal clusters (CNCs) of magnetite ($Fe_3O_4$). The size of the clusters can be controlled from about thirty nanometers (nm) to about three hundred nm by using a high-temperature hydrolysis process. The combination of superpara-magnetic property, high magnetization per particle, monodispersity, and high water dispersibility makes the CNCs ideal candidates for various important biomedical applications such as drug delivery, bioseparation, and magnetic resonance imaging. Each cluster is composed of many single magnetite crystallites of about ten nm, thus retaining the superparamagnetic properties at room temperature. The use of a surfactant in synthesis renders the clusters highly water dispersible. The CNCs show strong responses to external magnetic field due to their much higher magnetization per particle than that of individual magnetite "nanodots," which are defined herein as isolated particles each of which has a single crystalline domain. A "cluster" is defined herein as particles that are composed of many single crystallites.

Previously reported superparamagnetic iron oxide nanocrystals have typical dimensions of order ten nm. Due to their low magnetization per particle, it has been difficult to effectively separate them or control their movement in solution using moderate magnetic fields, thus limiting their usage in some practical applications. Increasing the particle size increases the saturation magnetization, but also induces the superpara-magnetic-ferromagnetic transition (at a particle size about thirty nm for $Fe_3O_4$) so that particles are no longer dispersible in solution. The strategy of forming clusters of magnetite nanocrystals has the advantage of increasing the magnetization in a controllable manner while retaining the superparamagnetic characteristics.

This invention also describes a magnetically tunable photonic crystal system by assembling highly charged superparamagnetic $Fe_3O_4$ colloidal nanocrystal clusters (CNCs) in aqueous solution. Stabilized by the balance of attractive (magnetic) and repulsive (electrostatic) forces, the colloids form ordered structures along the direction of the external magnetic field with a regular interparticle spacing on the order of hundreds of nanometers. As a result, the solutions strongly diffract visible light. This novel photonic crystal system has several remarkable merits. Since the interparticle spacing is determined by the relative strengths of electrostatic repulsions and magnetic attractions, one can conveniently tune the diffraction wavelength throughout the entire visible spectrum by changing the strength of the external field. The optical response has also been found sensitive to both the size of the colloids and the ionic strength of the solution. Due to the high refractive index of iron oxide, strong diffraction is realized at a low volume fraction of particles (~0.06%). In addition, a relatively weak magnetic field (~100-400 Gauss) is sufficient to induce the ordering of CNCs as a result of the high magnetic moment possessed by each particle. The optical response of the solutions to the variation of magnetic field is found to be fast, fully reversible, and compatible with miniaturization, suggesting great potential for uses in sensors, optical switches, and color displays. The concentration of stray electrolytes also has a strong effect on the optical response of the solution as it changes the strength of the interparticle electrostatic repulsion. Other factors including the size, size distribution and concentration of the colloids have also been examined to optimize the diffraction intensity and tuning range.

Tunable photonic structures have also been formed in alkanol solutions by assembling silica coated $Fe_3O_4$ CNC colloids using magnetic fields. Surface modification of $Fe_3O_4$ CNCs with silica shells allows their dispersion in nonaqueous alkanol solutions. Both electrostatic and solvation forces contribute to the interparticle repulsion which counters the magnetically induced attractive force during the assembly of $Fe_3O_4@SiO_2$ colloids in alkanol solutions. The system reported here shows important features such as a fast, reversible and tunable optical response to external magnetic fields, high stability, and convenient control of the working diffraction range by changing the silica shell thickness. The ability to assemble the magnetic particles in nonaqueous solutions allows the fabrication of field-responsive polymer composite films for potential applications as displays or sensors.

Other features and advantages of the present invention will become more apparent from the following detailed description of the invention, when taken in conjunction with the accompanying exemplary drawings.

DETAILED DESCRIPTION OF THE INVENTION

The present invention is directed to superparamagnetic magnetite colloidal nanocrystal clusters (CNC) and methods of their production. Highly water soluble magnetite ($Fe_3O_4$) CNCs are synthesized by a high temperature hydrolysis reaction using a precursor, a surfactant, a precipitation agent and a polar solvent. A NaOH/DEG stock solution was prepared by dissolving NaOH (50 mmol) in DEG (20 ml); this solution was heated at 120° C. for one hour under nitrogen, and cooled down and kept at 70° C. In a typical synthesis, a mixture of PAA (4 mmol), $FeCl_3$ (0.4 mmol) and DEG (17 ml) was heated to 220° C. in a nitrogen atmosphere for at least 30 min under vigorous stirring, forming a transparent light-yellow solution. A NaOH/DEG stock solution (1.75 ml) was injected rapidly into the above hot mixture, and the temperature dropped to about 210° C. instantly. The reaction solution slowly turned black after about two minutes and eventually slightly turbid. The resulting mixture' was further heated for 1 h to yield 93-nm magnetite clusters. The amount of NaOH/DEG solution determines the size of the CNCs. For example, 1.6, 1.65, 1.7, 1.8, 1.85 ml of stock solutions lead to the formation of CNCs with average sizes of 31, 53, 71, 141, 174 nm, respectively. The final products were washed with the mixture of deionized (DI) water and ethanol several times and then dispersed in DI water.

The method of the present invention for forming colloidal nanocrystal clusters includes precursors chosen from iron salts including, but not limited to, iron (II) chloride, iron (III) chloride, iron (II) sulfate, iron (III) sulfate, iron (II) nitrate, iron (III) nitrate, iron (II) fluoride, iron (III) fluoride, iron (II) bromide, iron (III) bromide, iron (II) iodide, iron (III) iodide, iron (II) sulfide, iron (III) sulfide, iron (II) selenide, iron (III) selenide, iron (II) telluride, iron (III) telluride, iron (II) acetate, iron (III) acetate, iron (II) oxalate, iron (III) oxalate, iron (II) citrate, iron (III) citrate, iron (II) phosphate, iron (III) phosphate. Other transition metals such as cobalt, nickel, and manganese can be incorporated into the synthesis by adding the corresponding salts so that the final products are iron based complex oxides. Suitable surfactants for use in the method of the present invention can be chosen from a wide range of polyelectrolytes such as, but not limited to those containing carboxylic acid groups including polyacrylic acid and polymethacrylic acid. Suitable polar solvents for use in the method of the present invention include, but are not limited to, ethylene glycol, diethylene glycol, triethylene glycol, tetraethylene glycol and polyethylene glycols.

In the method of the present invention, the precipitation of the colloidal nanocrystal clusters can be initiated by adding bases such as hydroxides, carbonates, bicarbonates, phosphates, hydrogen phosphate, dihydrogen phosphates of group 1 and 2, ammonium (for example, NaOH, KOH, $Na_2CO_3$, $K_2CO_3$), ammonia, as well as group 1 salts of carbanions, amides and hydrides. The reaction to form the colloidal nanocrystal clusters of the present invention can be carried out at a temperature between room temperature and the boiling point of the solvents. In one embodiment, the temperature for synthesis is controlled between about 100° C. to about 320° C. In accordance with the present invention, the size of the clusters can be controlled from approximately thirty (30) nm to approximately three hundred (300) nm.

In one embodiment of the present invention, highly water soluble magnetite ($Fe_3O_4$) CNCs are synthesized by using a high temperature hydrolysis reaction with polyacrylic acid (PAA) as the surfactant. Iron (III) chloride ($FeCl_3$) is used as a precursor, and diethylene glycol, (DEG, a polyhydric alcohol with a boiling point of 244-245° C.) is used as a polar solvent. PAA was selected as the surfactant for the strong coordination of carboxylate groups with iron cations on the magnetite surface. An additional advantage of using PAA is that the uncoordinated carboxylate groups on the polymer chains extend to aqueous solution, conferring upon the particles a high degree of dispersibility in water. Introduction of sodium hydroxide (NaOH) into the hot mixture of DEG, $FeCl_3$ and PAA produces water molecules and also increases the alkalinity of the reaction system, with both results favoring the hydrolysis of $Fe^{3+}$. Under the reductive atmosphere provided by DEG at high temperature, $Fe(OH)_3$ partially transforms to $Fe(OH)_2$, finally leading to the formation of $Fe_3O_4$ particles through dehydration. These $Fe_3O_4$ nanocrystals spontaneously aggregate to form flower-like three-dimensional clusters, as shown in the representative transmission electron microscopy (TEM) images in FIGS. 1a-1f. The average sizes of the CNCs in FIGS. 1a-1f, obtained by measuring about 150 clusters for each sample, are 31 nm, 53 nm, 71 nm, 93 nm, 141 nm, and 174 nm respectively, wherein all scale bars are 200 nm. Close inspection of these images confirms that these monodisperse colloids are consisted of small subunits.

Figures 1A, 1B, 1C, 1D, 1E, 1F:
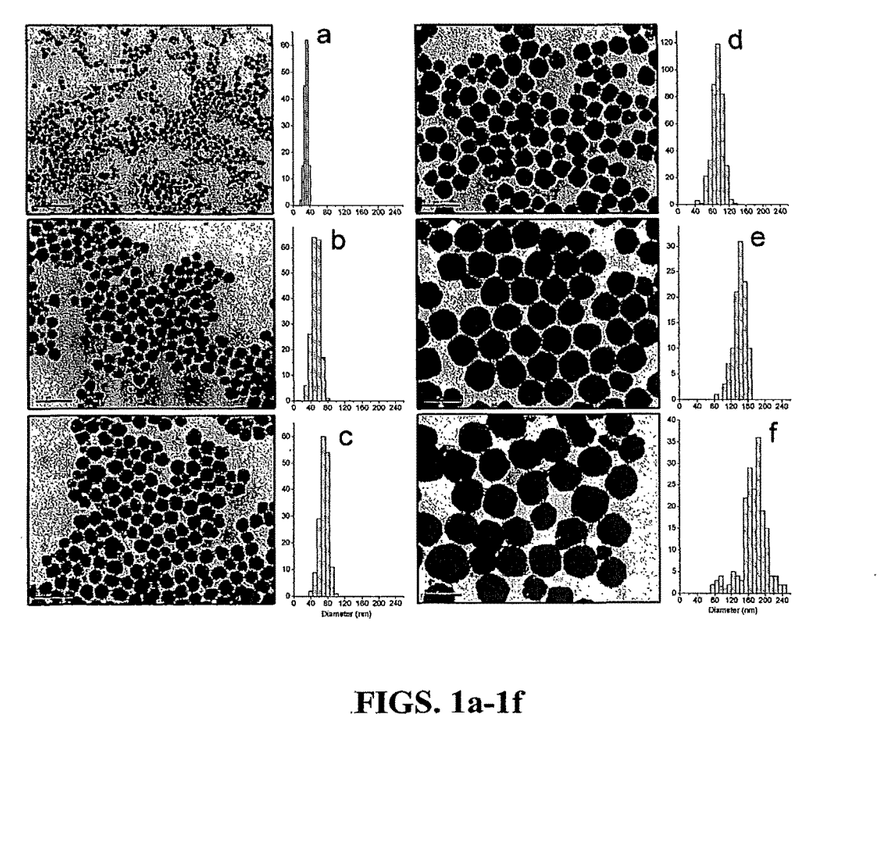
FIGS. 1a-1f are transmission electron microscopy (TEM) images of $Fe_3O_4$ nanocrystal clusters in the present invention.

The size of the CNCs can be precisely controlled from ~30 nm to ~300 nm by simply increasing the amount of NaOH while keeping all other parameters fixed (FIG. 1). This size tunability might be the result of slight differences in $H_2O$ concentration and alkalinity caused by varying NaOH additions. Higher $H_2O$ concentration and relatively stronger alkalinity could accelerate the hydrolysis of $Fe^{3+}$, promoting the formation of larger oxide clusters. The growth of CNCs follows the well-documented two-stage growth model where primary nanocrystals nucleate first in a supersaturated solution and then aggregate into larger secondary particles.

Figures 2A, 2B, 2C, 2D:
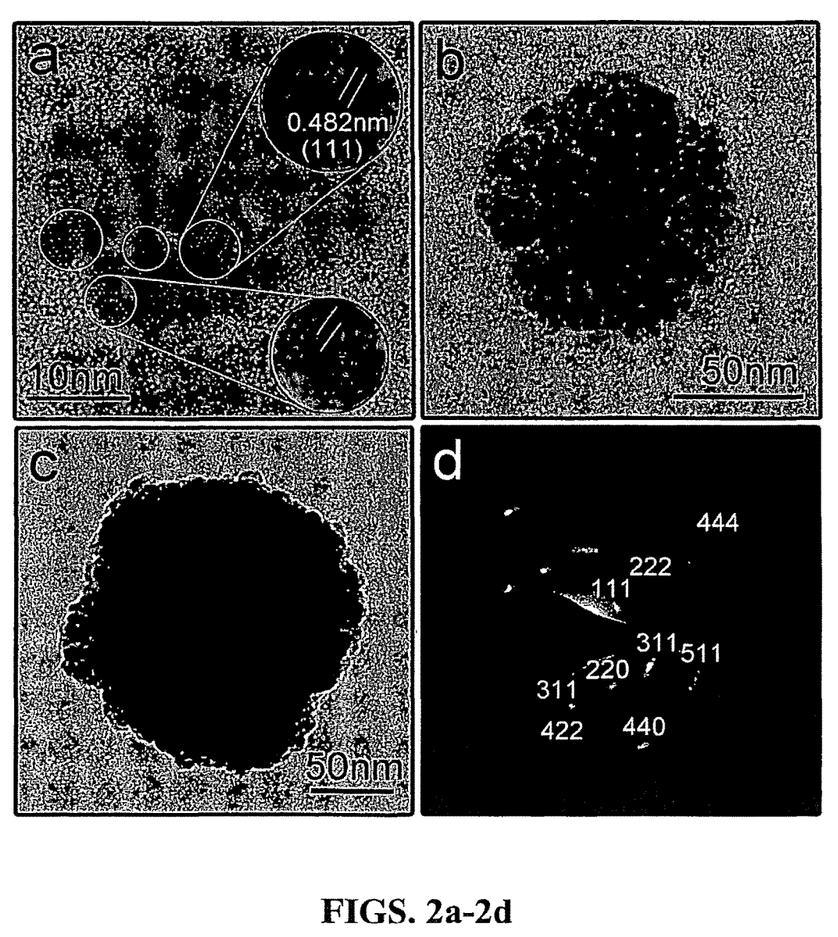
FIGS. 2a-2c are high-resolution and high magnification TEM images of secondary structures for isolated colloidal nanocrystal clusters in the present invention.
FIG. 2d is the selected area diffraction of an isolated colloidal nanocrystal cluster.

The secondary structure of CNCs can be observed more clearly in FIGS. 2a-2c for isolated clusters of ~31 nm, ~93 nm, and ~174 nm, respectively. Lattice fringes were recorded for a small cluster with diameter of 31 nm, as shown in the high-resolution TEM (HRTEM) image in FIG. 2a. It's clear that the cluster is composed of small subcrystals of 6-8 nm size and of the same crystal orientation. Measuring the distance between two adjacent planes in a specific direction gives a value of 0.482 nm, which corresponds to the lattice spacing of (111) planes of cubic magnetite. The fact that subcrystals crystallographically align with adjacent ones can be understood as the result of oriented attachment and subsequent high temperature sintering during the synthesis. FIGS. 2b and 2c show the secondary structures of CNCs of much larger size. FIG. 2d shows selected-area electron diffraction (SAED) pattern recorded on an isolated cluster of ~174 nm, which reveals a single-crystal-like diffraction where diffraction spots are seen to have widened into narrow arcs, indicating slight misalignments among the subcrystals.

Figure 3:
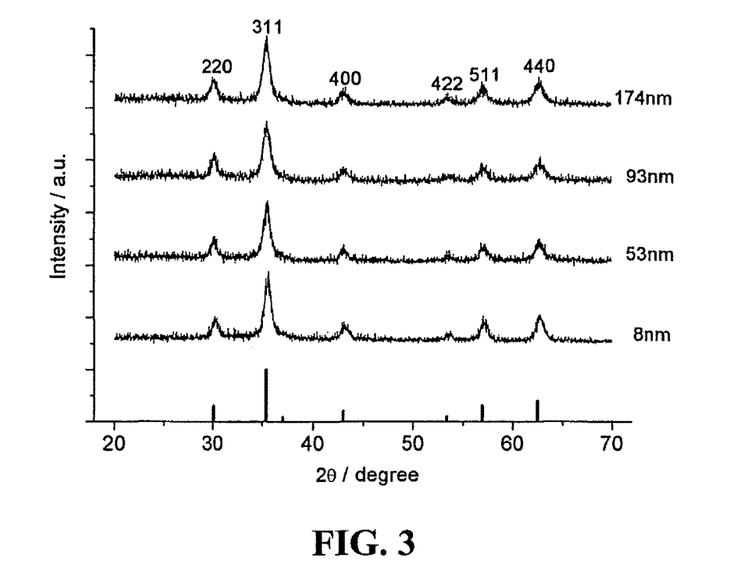
FIG. 3 shows X-ray diffraction patterns confirming the secondary structure of magnetite colloidal nanocrystal clusters of the present invention and magnetite nanodots as a reference.
Figure 4:
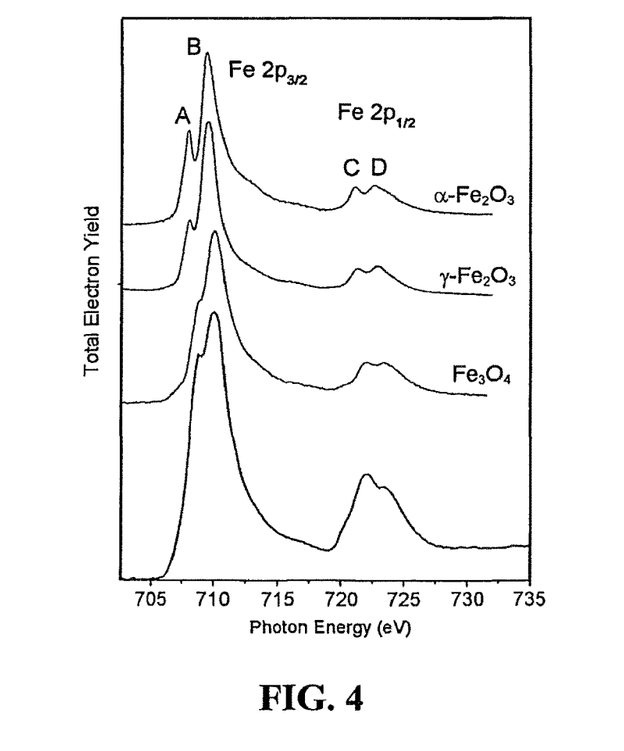
FIG. 4 is a XAS spectrum at Fe L edge of $Fe_3O_4$ colloidal nanocrystal clusters and referential spectra for $Fe_3O_4$, $\gamma$-$Fe_2O_3$, $\alpha$-$Fe_2O_3$.

XRD measurements also confirm the secondary structure of magnetite CNCs. FIG. 3 shows the diffraction patterns with almost identical broadenings for clusters of different sizes of 53-nm, 93-nm, and 174-nm and 8-nm magnetite nanodots, wherein peak positions and intensities recorded in the literature for bulk magnetite samples are indicated by the vertical bars. Calculations using Debye-Scherrer formula for the strongest peak (311) give grain sizes of 9.73, 9.65 and 10.83 nm for CNCs of size 53, 93 and 174 nm, respectively, implying that the subcrystals do not grow significantly with the increasing size of CNCs. Consistently, the peak shape and broadening in XRD patterns of CNCs are comparable to that of 8-nm isolated nanodots. We also confirmed the composition of iron oxide being magnetite by combining the XRD results with the X-ray absorption spectroscopy (XAS) measurements in FIG. 4.

Figures 5A, 5B:
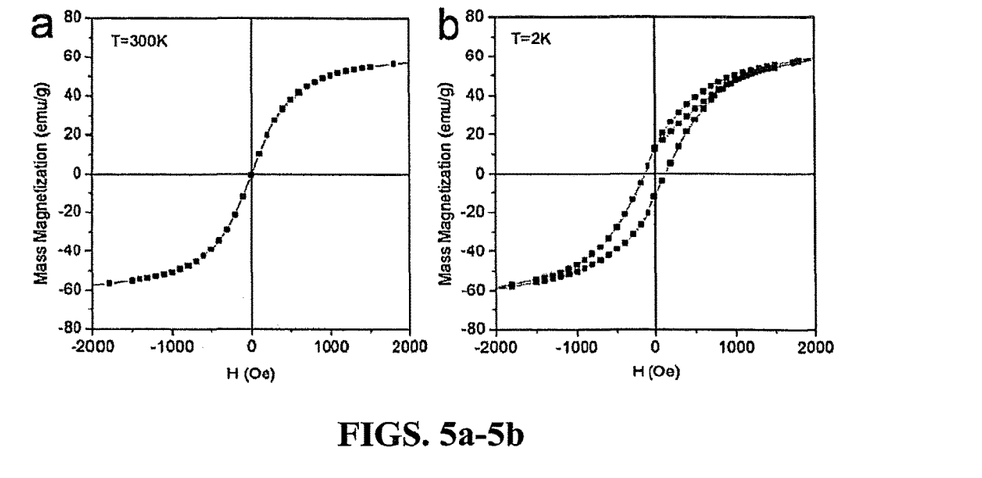
FIGS. 5a-5c show hysteresis loops of colloidal nanocrystal clusters of the present invention, wherein mass magnetization (M) is plotted as a function of applied external field.
Figure 5C:
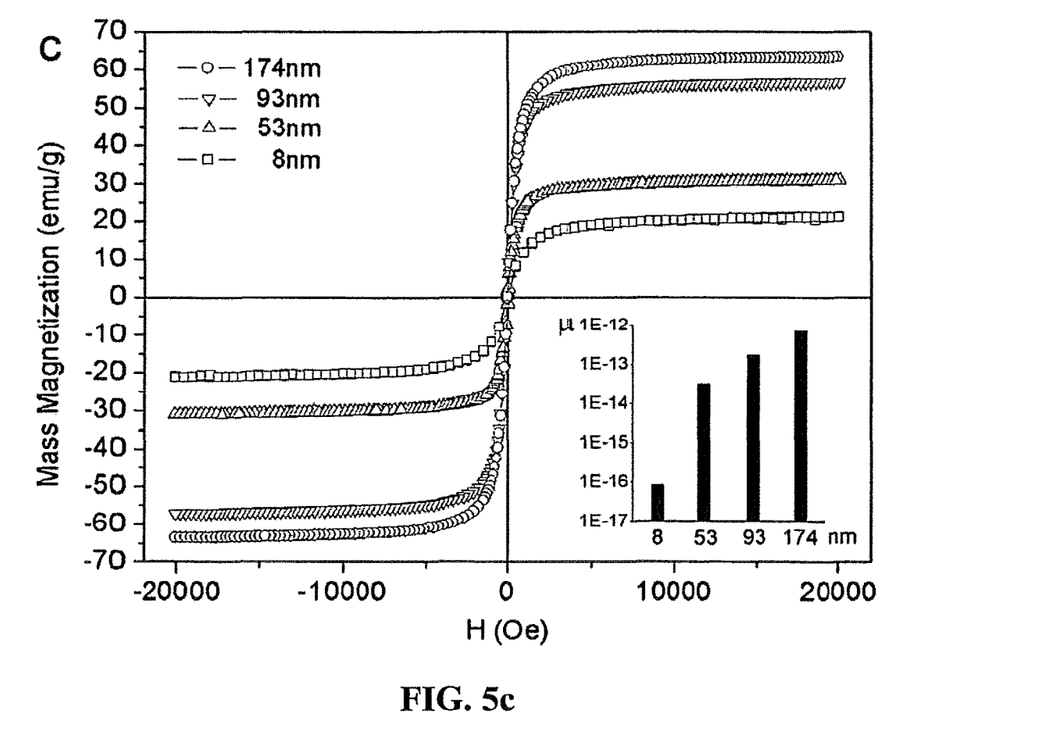

The unique and complex structure allows CNCs to retain superparamagnetic behavior at room temperature even though their size exceeds 30 nm. FIGS. 5a and 5b show hysteresis loops of 93-nm CNCs measured at 300° K. and 2° K., respectively. FIG. 5c is a comparison of hysteresis loops of 53-nm, 93-nm, 174-nm CNCs and a reference sample of 8-nm nanodots and the insert depicts the magnetic moment (μ) per cluster (or dot) plotted in a logarithmic graph. The clusters show no remanence or coercivity at 300° K., corresponding to superparamagnetic behavior. At 2° K., thermal energy is insufficient to induce moment randomization so that the clusters show typical ferromagnetic hysteresis loops with a remanence of 12.6 emu/g and a coercivity of 140 Oe.

To evaluate the magnetic response of CNCs to an external field, the mass magnetization (σ) was measured at 300° K. by cycling the field between −20 kOe and 20 kOe. FIG. 5c shows that all the CNCs, as the reference sample of 8-nm $Fe_3O_4$ nanodots, are superparamagnetic at room temperature, i.e., 300° K. The saturation magnetization ($σ_s$) was determined to be 63.5 emu/g, 56.7 emu/g, 30.9 emu/g, 21.2 emu/g for 174-nm, 93-nm, 53-nm CNCs and 8-nm particles, respectively. The values for large clusters are close but decrease noticeably for small particles, which may be attributed to a surface related effect such as surface disorder or surface spin canting. The magnetic moment of an individual grain (μ) can be determined by the Langevin paramagnetic function: $M(x)=Nμ(cothx-(1/x))$.

The CNCs are highly water soluble even after washing with the mixture of ethanol and water for three times, thanks to the robust surface coating of PAA. The method of the present invention included the ability to visualize their magnetic responses in an optical microscope by observing a thin layer of aqueous dispersion of CNCs on a glass substrate.

Figures 6A, 6B, 6C, 6D, 6E, 6F:
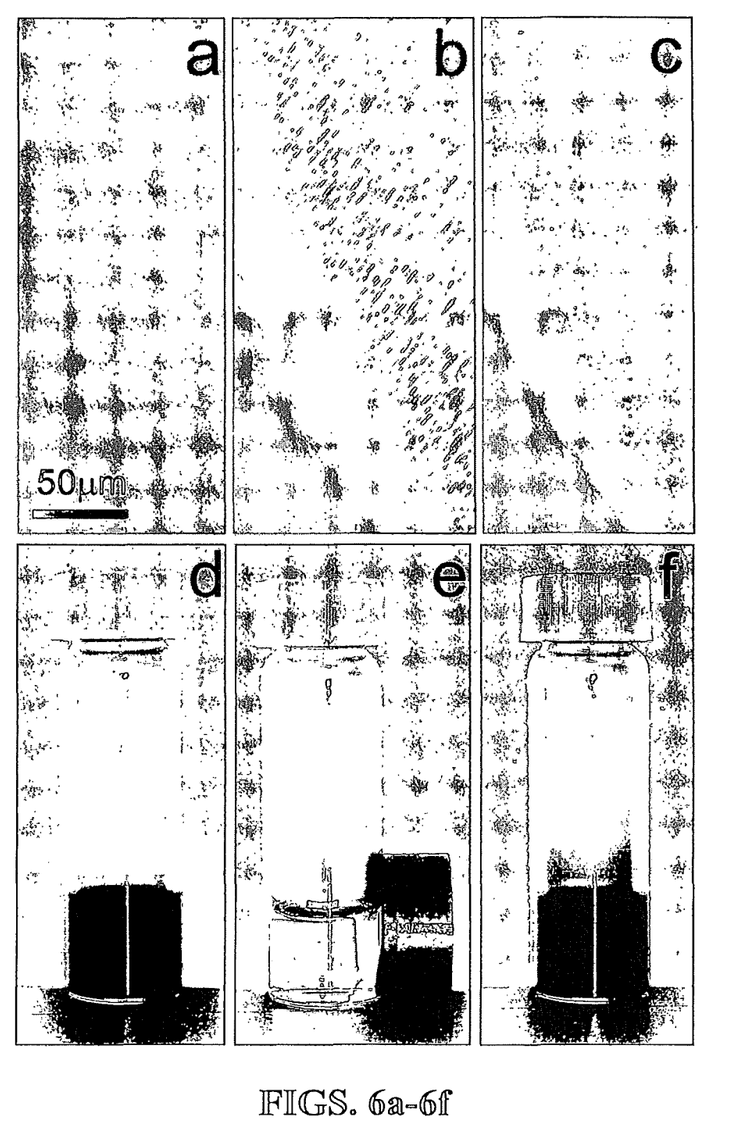
FIGS. 6a-6c show the aqueous dispersion of colloidal nanocrystal clusters of the present invention on a glass substrate.
FIGS. 6d-6f show photos of a CNC aqueous dispersion in a vial with or without magnetic field applied.

FIGS. 6a-6c show optical dark-field images of a thin layer of CNC aqueous dispersion on a glass substrate, without magnetic field, with magnetic field, and after the applied magnetic field is removed, respectively. The bright region at the lower-left corner in each image represents the dried CNCs.

As shown in FIG. 6b, the initially well-dispersed CNCs shown in FIG. 6a forms chain-line structures when a magnetic field was applied. The chain-like structures are disassembled immediately upon removing the external field, as seen in FIG. 6c, displaying a typical superparamagnetic behavior. FIGS. 6d-6f show photos of a CNC aqueous dispersion in a vial without magnetic field, with magnetic field, and after the applied magnetic field is removed, respectively. If a CNC solution is subjected to a strong magnetic field, the particles can be completely separated from the solution within minutes, as shown in FIGS. 6d and 6e. A slight agitation will bring the CNCs back into the original solution if the magnetic field is removed as shown in FIG. 6f.

The present invention is further directed to a method for constructing colloidal photonic crystals out of the polyacrylate capped superparamagnetic magnetite ($Fe_3O_4$) colloidal nanocrystal clusters (CNCs) with tunable size from about thirty to about three hundred nm using a high-temperature hydrolysis process. The colloidal photonic crystals show highly tunable diffractions covering the whole visible region owing to the highly charged polyacrylate covered surfaces and the strong magnetic responses of the magnetite CNCs. Such a system, with the advantages of simple and inexpensive to synthesize, wide and reversible tunability, and instant response to external magnetic field, opens the door to many critical applications including as active components in optical micro-electromechanical (MEMS) systems.

Uniform magnetite CNC building blocks were synthesized by hydrolyzing $FeCl_3$ with NaOH at about 220° C. in a diethylene glycol (DEG) solution containing the surfactant of polyacrylic acid (FAA), which is described in the last section. These CNCs retain the superparamagnetic behavior at room temperature and show much stronger response to the external magnetic field than individual nanodots. Polyacrylate binds to the particle surface through the strong coordination of carboxylate groups with iron cations, while the uncoordinated carboxylate groups on the polymer chains extend to aqueous solution and render the particles highly charged surfaces.

Figures 7A, 7B:
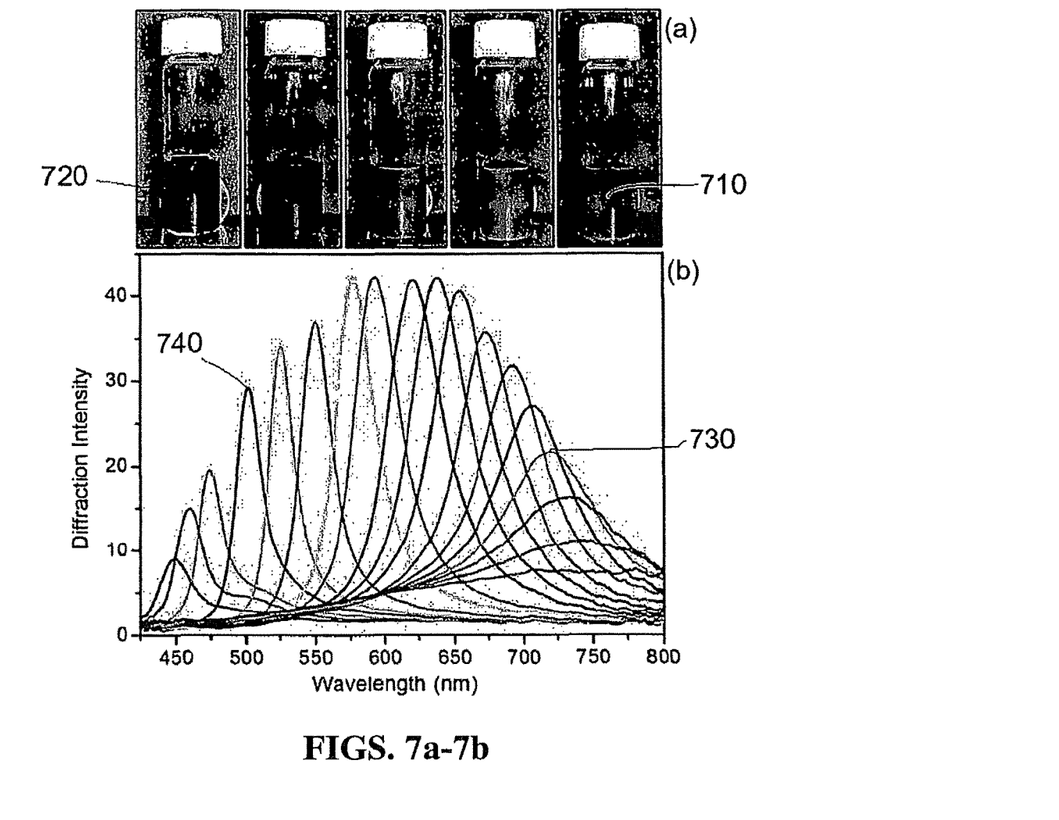
FIGS. 7a-7b show the digital photos and reflectance spectra, respectively, of an aqueous solution of CNCs made in the present invention in response to a varying magnetic field at normal incidence.

These $Fe_3O_4$ CNCs can readily self-assemble into colloidal crystals in deionized water upon application of a magnetic field; after removing the extra surfactants and decreasing the ionic strength through repeated centrifugation. FIGS. 7a and 7b show the digital photos and reflectance spectra, respectively, of an aqueous solution of CNCs (approximately 10.2 mg/ml) in response to a varying magnetic field at normal incidence. The colloidal photonic crystals, shown in FIG. 7a, with magnetically tunable diffractions covering the whole visible spectra have been fabricated from superparamagnetic magnetite 120-nm CNCs. The magnetic field has been increased from 87.8 to 352 Gauss by moving a NdFeB magnet towards the sample (3.7-2.0 cm) with step size of 0.1 cm. As shown in FIG. 7a, the color of the aqueous solution of CNCs changes from red (in the vial 710) to blue (in the vial 720) as the magnetic filed increases. As shown in FIG. 7b, the diffraction peak resulting from the close pack (111) planes accordingly blue shifts under increasing magnetic filed as, for example, the peak 730 shifts to the peak 740. The peak frequency gradually shifts from about 750 nm to below 450 nm. As the magnet moves away from the sample, the diffraction peak reversibly red shifts. A rapid response (<<1 s) of the diffraction to the change in the magnetic field is observed. The interplanar spacing decreases from 274 to 169 nm as the strength of magnetic field increases, as estimated by using the Bragg's Law ($\lambda$=2nd sin $\theta$), where $\lambda$ is the diffraction wavelength, n is the refractive index of water, d is the lattice plane spacing, and $\theta$=90° is the Bragg angle.

The three-dimensional order of the formed colloidal crystals is the result of the balance between the interparticle electrostatic repulsive force and the magnetic forces. The as synthesized CNCs without cleaning show no diffractions even when the magnetic field is so strong that they are separated from the solution. Their optical response to the magnetic field increases with the number of cleaning cycles which reduce the ionic strength of the solution and increases the Debye-Hückel screening length and therefore the electrostatic repulsion ξ-potential measurement of a sample cleaned five times gave a typical value of −51 mV, demonstrating their highly charged surface characteristics. Unlike the previously reported case for superparamagnetic polystyrene spheres, the CNCs do not form colloidal crystal in the absence of a magnetic field.

Since CNCs are composed of pure $Fe_3O_4$, their response to the external magnetic field is much stronger than that of the similarly sized polystyrene beads doped with iron oxide nanoparticles. The application of magnetic field results in additional magnetic packing forces, magnetic dipole-dipole repulsive and attractive forces. The magnetic packing force is exerted on every cluster and attracts them towards the maximum of local magnetic gradient. The repulsive and attractive forces are perpendicular and parallel to the magnetic field, respectively. For example, a 120-nm cluster shows a magnetic moment $\mu$ about $6.319 \times 10^{-14}$ emu in a 235 Gauss magnetic field, and experiences a magnetic packing force($F_m = \nabla(\mu B)$) of $1.26 \times 10^{-11}$ dyn in a 200 Gauss·cm$^{-1}$ gradient. With a 197.4 nm nearest-neighbor spacing d derived from the diffraction peak position, the interparticle repulsive force $F_{mr} = 3(\mu^2/d^4)$ and the attractive force $F_{ma} = 6(\mu^2/d^4)$ are estimated to be $9.91 \times 10^{-7}$ and $1.98 \times 10^{-6}$ dyn respectively. These values, which are negligible when the magnetic moment per particle is small, are now comparable to that of the interparticle electrostatic repulsive forces. It is also worth noting that the magnetic field required for inducing the ordering of the particles in the current system is ten times less than the previously reported value due to the much stronger magnetic moment of the $Fe_3O_4$ CNCs. The broad tunability and rapid responses of the current system may benefit from the large contribution of the magnetic forces in determining the crystal structure and the lattice constant.

Figure 8:
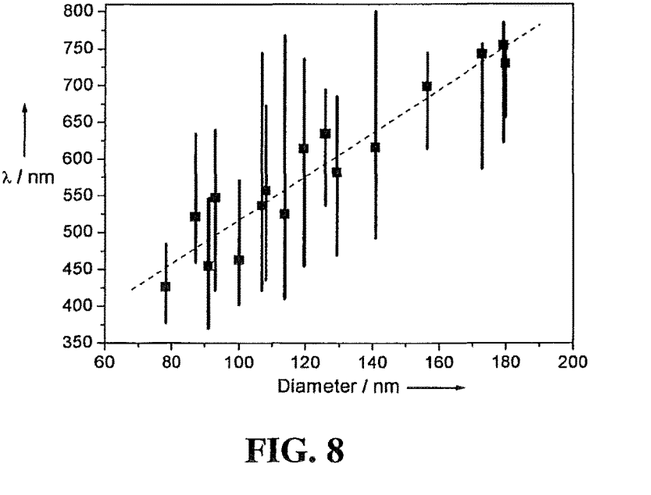
FIG. 8 shows the dependence of the tuning range of diffraction spectra of the colloidal photonic crystals, represented by the vertical bars, and the wavelength of maximum diffraction intensity, represented by the solid squares, on the size of CNCs.

The tuning range of the diffraction wavelength is found to relate to the average size of the CNCs. In general, crystals of large-size clusters (~160-180 nm) preferably diffract red light in a relatively weak magnetic field, and their ordered structures become unstable when the magnetic field is too strong. Small-size clusters (~60-100 nm) form ordered structures only when the magnetic field is sufficiently strong and the crystals preferably diffract blue light. As demonstrated by the example in FIG. 7b, the medium-size clusters can form stable colloidal crystals in a magnetic field with tunable diffractions covering the whole visible spectrum. To clearly reveal such size dependence, FIG. 8 plots the tuning range of colloidal photonic crystals, represented by the vertical bars, and the wavelength of maximum diffraction intensity, represented by the solid squares, against the size of CNCs. For each sample, the position of maximum diffraction intensity is determined by the polynomial fitting of the curve consisted of all peak values of the reflectance spectra, and the tuning range is obtained by including all the diffractions whose intensity is above 30% of the maximum value. FIG. 8 indicates that the diffraction with maximum intensity red-shifts as the size increases approximately in a linear fashion, which agrees with our visual observations.

Figure 9A:
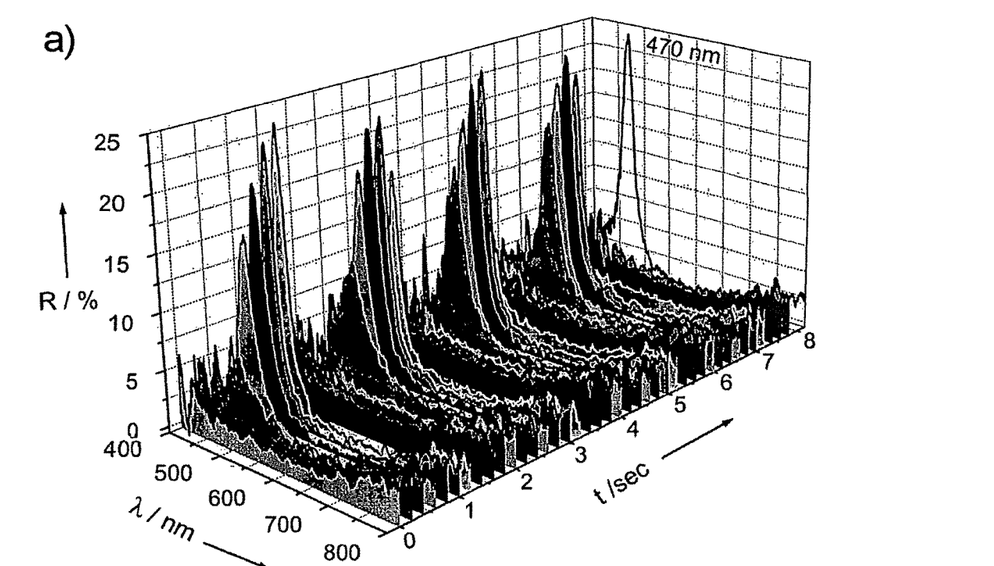
FIGS. 9a-9c show modulated optical responses of $Fe_3O_4$ colloidal photonic crystals in a periodic magnetic field of different frequencies.
Figure 9B:
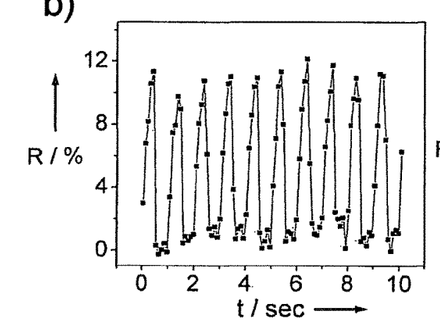
Figure 9C:
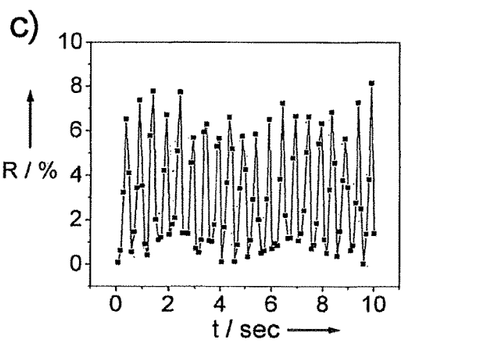
Figures 10A, 10B, 10C, 10D, 10E:
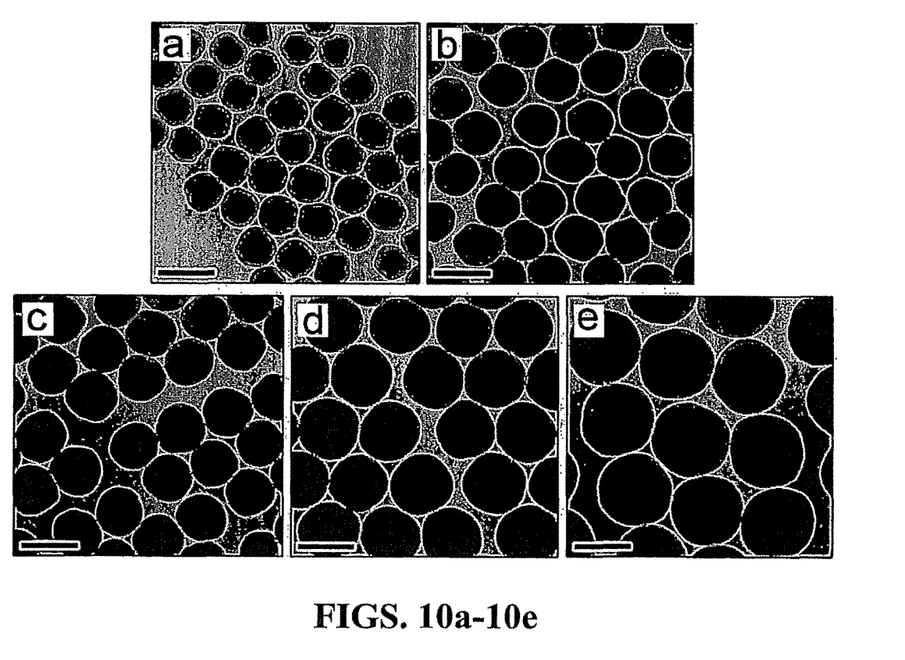
FIGS. 10a-10e show TEM images of $Fe_3O_4$ colloidal nanocrystal clusters coated with silica layers of various thickness ($Fe_3O_4@SiO_2$).

The optical responses of these photonic crystals are rapid and fully reversible. To characterize the response time, we recorded changes in the reflection spectrum of a magnetic colloidal photonic crystal in the presence of a periodically on-off magnetic field with a controllable switching frequency. FIG. 9*a* shows the reflection spectra of a 70 nm $Fe_3O_4$ colloidal photonic crystals in a periodic magnetic field with a frequency of 0.5 Hz with spectra integration time of 200 msec. They demonstrate that the switch of diffraction at ~470 nm between on and off states can be achieved with the same frequency as the external field. FIGS. 9*b* and 9*c* show the variation of peak intensity at 470 nm in response to electromagnetic fields at higher frequencies such as 1 and 2 Hz with integration time of 100 msec. As shown in FIGS. 9*b* and 9*c*, the diffraction intensity shows periodic modulations which closely match the profile of external field, displaying clear on/off states with the corresponding frequency. No gradual transition from longer wavelengths to the final shorter wavelength was observed during the development of the spectra, indicating that the ordered structures form within the first 200 msec upon the application of magnetic field. During the rest of the 'on' stage, the order of the crystals further improves as the remaining particles rearrange their positions. The diffraction peak disappears completely within 100-200 msec after the magnetic field is off, which is much faster than the time needed for development of translational order under a magnetic field.

Further modifications and improvements may additionally be made to the superparamagnetic magnetite colloidal nanocrystal clusters and methods of production disclosed herein without departing from the scope of the present invention. Accordingly, it is not intended that the invention be limited by the embodiments disclosed herein.

The present invention is further directed to a method of fabricating magnetically responsive photonic structures that can operate in nonaqueous solutions. Unlike the previously reported polyelectrolyte-grafted CNCs which are only dispersible in water, the modification of the particle surface with a layer of silica allows their dispersion in various nonaqueous organic solvents such as alkanols. Interestingly, upon application of an external magnetic field, the modified particles in these nonaqueous solvents can also assemble into ordered structures and diffract light. Given the expected diminished role for electrostatic forces for silica coated particles in alkanols, it is natural to suspect that other repulsive forces must be present to counter the magnetic attractive force and yield the observed persistence of ordering. The photonic response of the solutions to external fields suggests a rough range for this force and allows us to identify it with effects already observed in the literature. As well as allowing us to study fundamental details of interparticle forces, forming tunable photonic structures in nonaqueous solvents provides a number of advantages over the water-based approach for practical applications. For example, solvents with low volatility can now be used as dispersion media for improved long-term stability and ease of processing. The use of nonaqueous solvents also addresses the issue in the previous system where trace amount of ions released from environment such as glass containers may gradually alter the system's photonic response. While maintaining the merits of our earlier work with aqueous colloids such as a fast and reversible response, the modification with silica layer also provides a convenient method for extending the diffraction wavelength beyond the visible range. Our synthetic procedure currently can produce $Fe_3O_4$ CNCs with sizes below 300 nm, which limit the maximum diffraction wavelength to below ~800 nm. The size limitation can be conveniently overcome by coating a layer of silica whose thickness can be precisely controlled by using the facile sol-gel processes. The silica coating also makes it possible to link a large variety of ligands to the particle surface through the well-developed silane chemistry for further enhancing the compatibility between the particles and solvents.

FIGS. 10*a*-10*e* show TEM images of $Fe_3O_4$ colloidal nanocrystal clusters coated with silica layers of various thickness of 16.5, 25, 37, 56, and 70.5 nm, respectively, where the CNCs have a similar core size of ~110 nm. $Fe_3O_4@SiO_2$ colloids were synthesized as follows. $Fe_3O_4$ CNCs were synthesized using a high-temperature hydrolysis reaction reported previously. $Fe_3O_4@SiO_2$ core/shell colloids were prepared through a modified Stöber process. Typically, an aqueous solution (3 mL) containing $Fe_3O_4$ CNCs (~25 mg) was mixed with ethyl alcohol (20 mL), ammonium hydroxide (28%, 1 mL) aqueous solution by vigorous stirring using mechanical stirrer. TEOS (0.1 mL) was injected to the solution in every 20 min till the total amount of TEOS reaches 0.9 mL. At the end of every cycle, reflection spectra of reaction solution were measured under magnetic field (622 Gauss) to monitor the thickness of silica layer. After obtaining the desired size, the $Fe_3O_4@SiO_2$ colloids were collected by magnetic separation, washed by ethanol for three times, and finally dispersed in ethanol (3 mL).

$Fe_3O_4@SiO_2$ core-shell particles can be dispersed in a number of alkanol solvents and show a tunable optical response in the presence of an external magnetic field. The diffraction peak blue-shifts as the distance decreases from 4.3 to 1.9 cm with step size of 0.2 cm.

Figure 11:
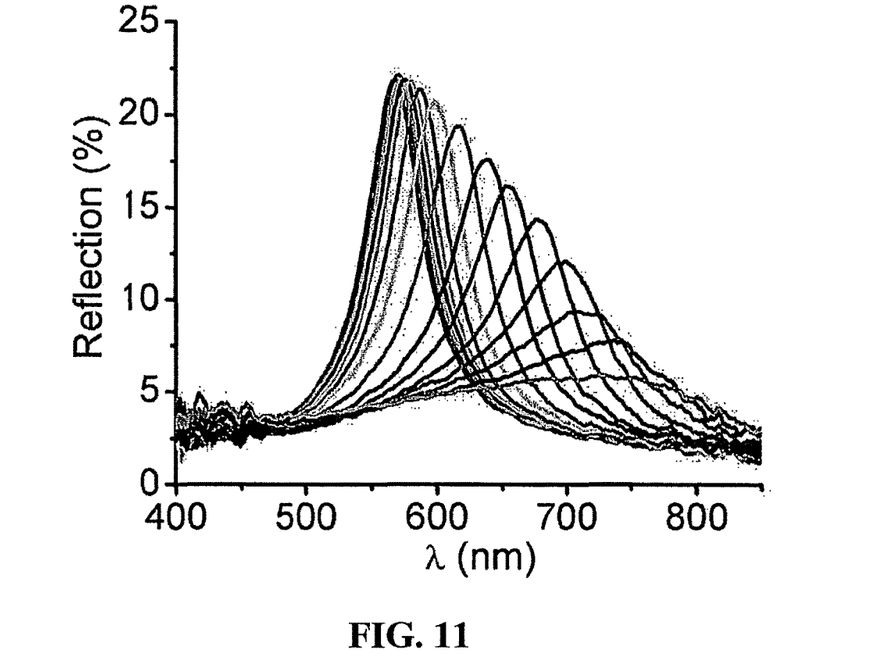
FIG. 11 shows reflection spectra of $Fe_3O_4@SiO_2$ in ethanol solution in response to an external magnetic field with varying strength.

FIG. 11 shows the typical reflection spectra of an ethanol solution of 170-nm (overall diameter with 114 nm in core size and 28 nm in shell thickness) $Fe_3O_4@SiO_2$ as a function of the external magnetic field strength, achieved by changing the magnet-sample distance. The diffraction intensity increases steadily with increasing external field strength until reaching a saturation value. Further increasing the strength of the magnetic field does not significantly change the peak position and the peak intensity drops only slightly. The contour of the peaks therefore shows a skewed profile. From the reflection spectra, one can estimate an average value for interparticle spacings along the magnetic field using Bragg's law, $\lambda=2nd \sin \theta$, as well as a surface-to-surface distance, $d_{s-s}$, by subtracting the colloid diameter.

For the $Fe_3O_4@SiO_2$ dispersions in ethanol, besides the electrostatic force, another repulsive force, "solvation force," must be considered besides the reduced electrostatic force when discussing the interactions in the framework of Derjaguin-Landau-Verwey-Overbeek (DLVO) theory. It has been widely accepted that for an ethanol dispersion of silica, a wetting film of solvent formed on the silica surface through the hydrogen bonds can significantly stabilize the system. When the solvation layers of two nearby particles overlap, a strong disjoining pressure appears to prevent the particles from coming together. While the electrostatic force still remains effective at larger separations, the solvation force may dominate the interparticle repulsions at small separations, making it possible to counter the induced magnetic attractive force and assemble the particles into ordered structures. The combined effect of these two repulsive forces leads to the skewed dependence profile of the diffraction to the changes in the strength of magnetic field. By calculating the spacing from the shortest diffraction wavelength, we estimate the thickness of the solvation layer to be ~20.4 nm which is close to the value reported in literature. The solvation force is also present in aqueous systems, however, its contribution to the overall repulsive interaction might be negligible in comparison to the strong electrostatic force resulted from high surface charges.

Alkanol solutions of $Fe_3O_4@SiO_2$ colloids show significant long-term stability in photonic activity. In the previous aqueous $Fe_3O_4$ CNC system, slow release of ions from the environment or from the particles into the solution may eventually alter the photonic properties including both diffraction intensity and wavelength. The system reported here was able to display consistent photonic response after storage for several months, owing to the lower ionic strength of the alkanol solutions and the predominantly non-electrostatic contribution to interparticle repulsion.

The diffraction spectra of the $Fe_3O_4@SiO_2$ colloids can be modified by changing the thickness of the silica shell. To avoid the homogeneous nucleation of small silica particles, TEOS was added to the reaction slowly and continuously during the synthesis. Interestingly, the $Fe_3O_4@SiO_2$ colloids show an optical response to external magnetic field even in the original reaction solution (12.5% water, 4.2% $NH_4OH$ solution, and 83.3% ethanol), providing a convenient way to monitor the growth of silica layers around the $Fe_3O_4$ cores. The detection method is fast in comparison to other measurement techniques such as dynamic light scattering or TEM imaging. FIGS. 10a-10e show TEM measurements which confirm the increasing thickness of the silica shell from ~16 to ~70 nm. While the average diameter of the $Fe_3O_4$ CNCs is below 180 nm as limited by the synthesis procedure, silica coating allows to increasing the effective particle size in a controlled manner so that the diffraction wavelength of the photonic crystals can be extended into the near-IR region.

Figure 12:
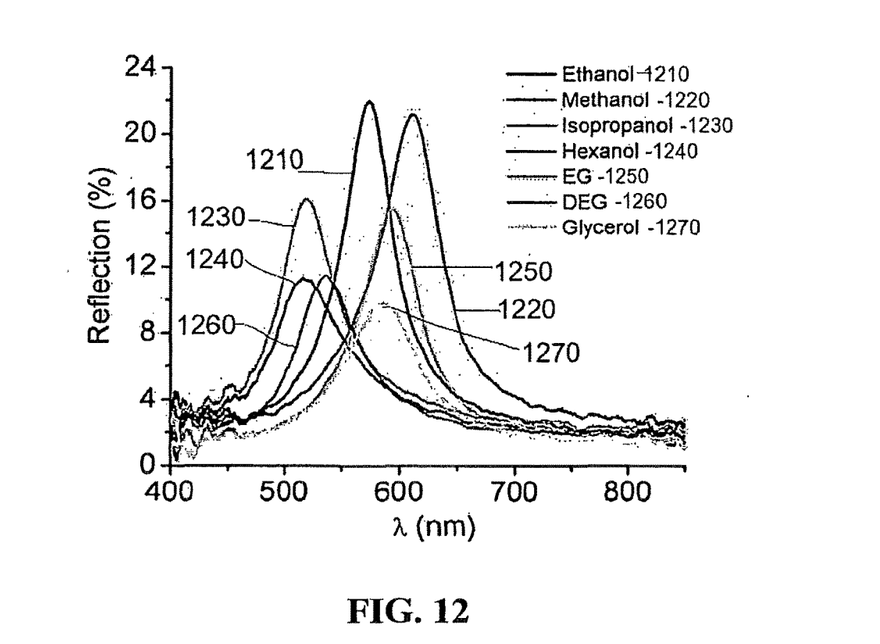
FIG. 12 shows reflection spectra of $Fe_3O_4@SiO_2$ colloids in various alkanol solvents in response to a defined magnetic field.

Silanol surface makes the $Fe_3O_4@SiO_2$ colloids compatible with many alkanol solvents besides ethanol. FIG. 12 shows the reflection spectra of 170-nm $Fe_3O_4@SiO_2$ colloids in various alkanol solvents in response to a same magnetic field of 622 Gauss. The applied magnetic field is strong enough to drive the neighboring particles close to "hard contact" so that the intensity of the diffraction is around the maximum value. In this case, the thickness of solvation layer ($d'=(d-d_{colloid})/2$) in each solvent can be estimated from the calculated lattice spacing (d)

The ability to assemble magnetic colloids into ordered structures in nonaqueous solvents represents a significant step towards the practical applications of these tunable photonic structures. The method of the present invention provides the ability to embed alkanol solutions of $Fe_3O_4@SiO_2$ colloids in a polydimethylsiloxane (PDMS) matrix in the form of liquid droplets, thus producing solid composite materials with field responsive optical properties. Similar operations have been extremely difficult using aqueous solutions due to the high polarity of water. In a typical process, $Fe_3O_4@SiO_2$ colloids are dispersed in a nonvolatile alkanol solvent such as EG, DEG, and glycerol, and then mixed with PDMS prepolymer and curing agent using mechanical stirring. Thanks to the high viscosity of prepolymer (3900 cp), EG solution of $Fe_3O_4@SiO_2$ forms very stable emulsion-like droplets with an average diameter of ~5 µm. The stability of droplets is also believed to benefit from the close match between the densities of the glycol and the PDMS matrix. Curing the mixture at room temperature for ~24 hours (or at 60° C. for 2 hours) produces a dark brown silicone gel, which displays color change property when placed under a varying magnetic field.

Figures 13A, 13B:
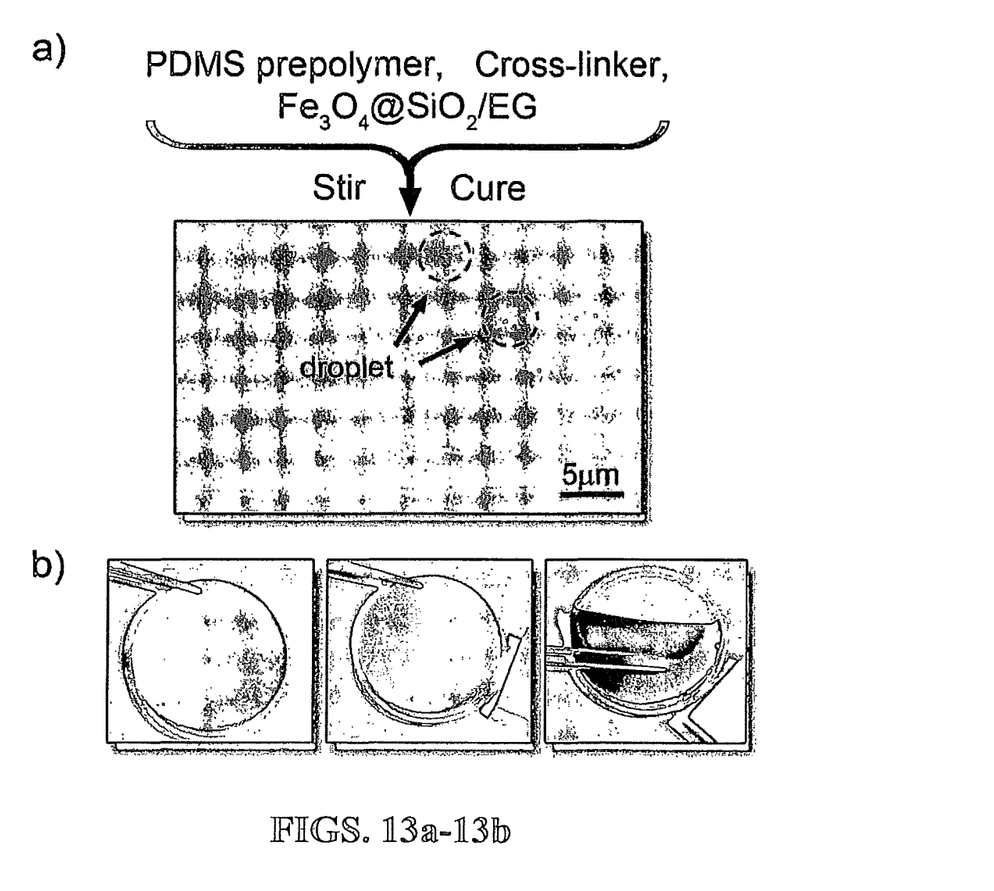
FIG. 13a shows fabrication procedure of a field-responsive PDMS composite embedded with droplets of EG solution of $Fe_3O_4@SiO_2$ colloid.
FIG. 13b shows magnetically induced color change of a flexible PDMS film with EG solution of $Fe_3O_4@SiO_2$ colloids.

EG droplets remain intact during the curing process. Direct observation of the droplets using optical microscope has been difficult due to the close match between the refractive indices of EG (1.431) and PDMS (1.430). FIG. 13a shows fabrication procedure of s field-responsive PDMS composite embedded with droplets of EG solution of $Fe_3O_4@SiO_2$ colloids and an optical microscopy graph of the droplets under a vertically aligned external magnetic field. The assembly of $Fe_3O_4@SiO_2$ colloids in the droplets under the magnetic field leads to the diffraction of green light. As shown in FIG. 13a, the droplets change color and show significantly increased contrast against the PDMS matrix under a vertically aligned magnetic field, and therefore can be easily observed and imaged. Careful inspection reveals that the droplets contain many bright spots, each of which represents a chain of $Fe_3O_4@SiO_2$ particles assembled along the magnetic field. FIG. 13b shows magnetically induced color change of a flexible PDMS film with EG solution of $Fe_3O_4@SiO_2$ colloids. As shown in FIG. 13b, the composite film retains the flexibility of the PDMS matrix and can be folded into various shapes while still displaying magnetically induced colors. The material is also very stable, wherein no apparent degradations in optical or mechanical properties were observed after storing the samples for month.

We claim:

1. A method of forming chain-like colloidal assemblies that diffract light, consisting of:
   mixing an iron salt precursor, a polar solvent, and a surfactant to form a first mixture;
   introducing a precipitation agent into the first mixture to initiate a hydrolysis reaction, wherein the precipitation agent is a base;
   controlling the hydrolysis reaction to occur at a temperature ranging from about 100° C. to about 320° C.;
   obtaining monodisperse superparamagnetic magnetite colloidal particles from the hydrolysis reaction, wherein each of the superparamagnetic magnetite colloidal particles is formed from a plurality of nanocrystals;
   controlling a size of the monodisperse superparamagnetic magnetite colloidal particles from about 30 nanometers to about 300 nanometers based on a concentration of the base;
   dispersing the monodisperse superparamagnetic magnetite colloidal particles in a polar solution; and
   applying an external magnetic field on the monodisperse superparamagnetic magnetite colloidal particles so as to assemble the magnetite colloidal particles in chain-like structures that diffract light in the polar solution, wherein the colloidal particles within the chain-like structures are periodically arranged, with tunable periodicity and diffraction frequency by varying the external magnetic field.

2. The method of claim 1, wherein the polar solution is chosen from the group comprising:
   water and solutions of other polar solvents wherein the superparamagnetic magnetite colloidal particles are dispersed.

3. The method of claim 1, wherein the diffraction frequency of the chain-like colloidal assemblies under varying the external magnetic field covers the entire visible region, the near-ultraviolet region, and the infrared region of the light spectrum.

4. The method of claim 1, wherein when the external magnetic field is oscillating, the optical response of the chain-like colloidal assemblies follows the oscillation.

5. A method of forming chain-like colloidal assemblies, consisting of:
   mixing an iron salt precursor, a polar solvent, and a surfactant to form a first mixture;
   introducing a precipitation agent into the first mixture to initiate a hydrolysis reaction, wherein the precipitation agent is a base;
   controlling the hydrolysis reaction to occur at a temperature ranging from about 100° C. to about 320° C.;
   obtaining monodisperse superparamagnetic magnetite colloidal particles from the hydrolysis reaction, wherein each of the superparamagnetic magnetite colloidal particles is formed from a plurality of nanocrystals;
   controlling a size of the superparamagnetic magnetite colloidal particles from about 30 nanometers to about 300 nanometers based on a concentration of the base;
   rendering a surface of the superparamagnetic magnetite colloidal particles to be dispersible in nonaqueous solvents;
   dispersing the superparamagnetic magnetite colloidal particles in a nonaqueous polar solution; and
   applying an external magnetic field on the superparamagnetic magnetite colloidal particles so as to assemble the magnetite colloidal particles in chain-like structures that diffract light in the nonaqueous solution,
   wherein the colloidal particles within the chain-like structures are periodically arranged, with tunable periodicity and diffraction frequency under varying the external magnetic field.

6. The method of claim 5, wherein the nonaqueous polar solution is chosen from a group consisting of alcohol solvents.

7. The method of claim 5, wherein rendering the surface of the monodisperse superparamagnetic magnetite colloidal particles includes coating the monodisperse superparamagnetic magnetite colloidal particles with a layer of silica.

8. The method of claim 7, further comprising the step of tuning a thickness of the silica layer for further tuning the diffraction frequency under the external magnetic field.

9. The method of claim 5, wherein the diffraction frequency of the chain-like colloidal assemblies under varying the external magnetic field covers the entire visible region, the far-ultraviolet region, and the infrared region of the light spectrum.

10. The method of claim 1, wherein the surfactant is chosen from the group consisting of polyelectrolytes.

11. The method of claim 1, wherein the obtaining of the superparamagnetic magnetite colloidal particles comprises:
    coating the particles with a layer of silica or polymer; and
    linking a ligand to the surface of the coated colloidal particles.

12. The method of claim 5, wherein the surfactant is chosen from the group consisting of polyelectrolytes.

13. The method of claim 5, wherein the obtaining of the superparamagnetic magnetite colloidal particles comprises:
    coating the colloidal particles with a layer of silica or polymer; and
    linking a ligand to the surface of the coated colloidal particles.

14. The method of claim 1, wherein each nanocrystal of the plurality of the nanocrystals is approximately 10 nanometers in size.

15. The method of claim 5, wherein each nanocrystal of the plurality of the nanocrystals is approximately 10 nanometers in size.

16. The method of claim 1, wherein upon removing the external magnetic field, the chain-like colloidal assemblies disassemble from the chain-like structures.

17. The method of claim 1, wherein the base is sodium hydroxide (NaOH).

18. The method of claim 1, wherein the surfactant is polyacrylic acid (PAA), the precursor is Iron (III) chloride ($FeCl_3$), the polar solvent is diethylene glycol, and the base is sodium hydroxide (NaOH).

19. The method of claim 1, comprising:
    controlling the size of the monodisperse superparamagnetic magnetite colloidal particles by modulating the concentration of the base while keeping all other parameters fixed.

* * * * *